(12) United States Patent
Gretz

(10) Patent No.: US 12,603,486 B1
(45) Date of Patent: Apr. 14, 2026

(54) FIRE-RATE POKE-THRU ASSEMBLY FOR QUAD RECEPTACLE

(71) Applicant: Arlington Industries, Inc., Scranton, PA (US)

(72) Inventor: Thomas J. Gretz, Delray Beach, FL (US)

(73) Assignee: Aarlington Industries, Inc., Scranton, PA (US)

( * ) Notice: Subject to any disclaimer, the term of this patent is extended or adjusted under 35 U.S.C. 154(b) by 183 days.

(21) Appl. No.: 18/218,923

(22) Filed: Jul. 6, 2023

Related U.S. Application Data

(60) Provisional application No. 63/358,596, filed on Jul. 6, 2022.

(51) Int. Cl.
H02G 3/18 (2006.01)
H02G 3/08 (2006.01)

(52) U.S. Cl.
CPC ............. H02G 3/185 (2013.01); H02G 3/088 (2013.01)

(58) Field of Classification Search
CPC .......... H02G 3/08; H02G 3/081; H02G 3/085; H02G 3/185; H02G 15/10; H02G 3/12; H02G 3/088; H05K 5/00; H05K 5/02; H01R 13/46; H01R 13/533; H01H 19/04; H01H 19/16
USPC ....... 174/480, 481, 50, 53, 57, 58, 483, 482; 220/3.2–3.9, 4.02
See application file for complete search history.

(56) References Cited

U.S. PATENT DOCUMENTS

| | | | | | |
|---|---|---|---|---|---|
| 5,237,128 | A * | 8/1993 | Wuertz | .................. | H02G 3/185 |
| | | | | | 174/53 |
| 5,393,930 | A * | 2/1995 | Wuertz | ................... | H02G 3/22 |
| | | | | | 52/220.8 |
| 5,410,103 | A * | 4/1995 | Wuertz | .................. | H02G 3/185 |
| | | | | | 174/483 |
| 6,470,635 | B2 * | 10/2002 | Cornwall | .................. | F16L 5/04 |
| | | | | | 52/220.8 |
| 6,551,130 | B2 * | 4/2003 | Bonilla | .................. | H01R 13/74 |
| | | | | | 174/483 |
| 7,053,296 | B2 * | 5/2006 | Drane | .................... | H02G 3/185 |
| | | | | | 174/483 |
| 7,082,729 | B2 * | 8/2006 | Cole | ...................... | H02G 3/185 |
| | | | | | 52/220.8 |
| 7,635,110 | B2 * | 12/2009 | Galasso | ................. | H02G 3/185 |
| | | | | | 174/483 |
| 7,674,990 | B2 * | 3/2010 | Drane | ................... | H02G 3/0493 |
| | | | | | 174/57 |

(Continued)

*Primary Examiner* — Angel R Estrada

(57) ABSTRACT

A fire-rated poke-thru (FRPT) device for routing power and low voltage through an opening in a concrete floor assembly. The FRPT includes a support plate including an opening configured for mounting of a quad receptacle and cutouts for attachment of a plurality of low voltage keystones. The quad receptacle includes a central body with four corners. The support plate is configured for mounting of a low voltage keystone at each of the corners of the quad receptacle. A section of electrical metal tubing extends from the support plate. The FRPT includes a top flange, a sliding plate, a bottom seal off, and one or more intumescent discs. The FRPT may be inserted within the opening in the concrete floor and secured thereto. If exposed to the heat from a fire, the intumescent discs will expand around the FRPT and prevent spreading of the fire through the floor opening.

10 Claims, 6 Drawing Sheets

(56)         References Cited

U.S. PATENT DOCUMENTS

| 7,678,993 | B2 * | 3/2010 | Jolly | ...................... | H02G 3/185 |
| | | | | | 174/480 |
| 9,490,616 | B1 * | 11/2016 | Galasso | ................. | H02G 3/185 |
| 11,088,523 | B1 * | 8/2021 | Gretz | ..................... | H02G 3/088 |

* cited by examiner

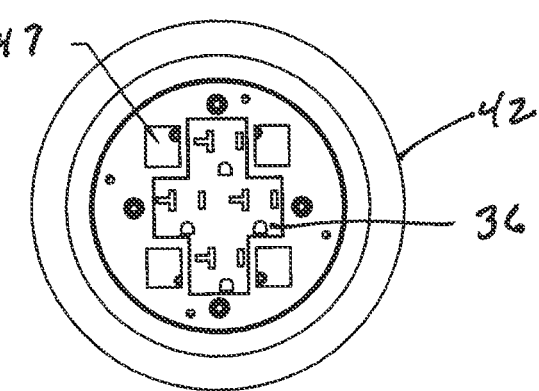
Fig. 3
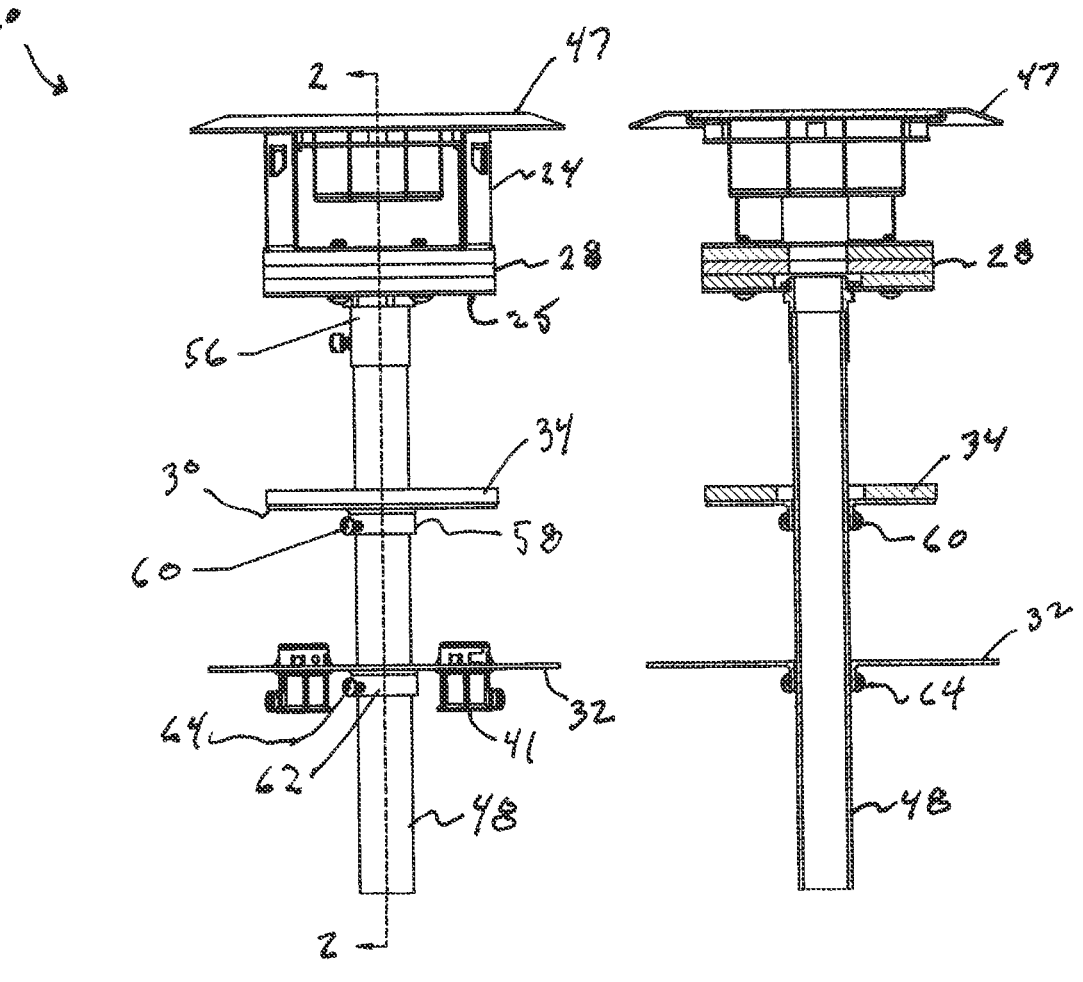
Fig. 1                                        Fig. 2

FIRE-RATE POKE-THRU ASSEMBLY FOR QUAD RECEPTACLE

This application claims the benefit of U.S. Patent Application No. 63/358,596, filed Jul. 6, 2022, which is still pending.

BACKGROUND OF THE INVENTION

Fire-Rate Poke-Thru (FRPTs) are devices for routing power and low voltage through concrete floors and are required, in the U.S. and Canada, to meet or exceed electrical standards for electrical outlet boxes (such as UL 514A in the U.S.) and must pass fire resistance standards (such as UL Standard 51UL 263 in the U.S.). The fire resistance standards are evaluated for suitability for use in a concrete structure by UL. A specific fire-resistance rating, expressed in hours, is then assigned by UL. The fire-resistance rating of the FRPT assembly must be equal to or better than the fire-resistance rating of the surrounding concrete floor structure that it will be mounted in.

Although various FRPTs have been proposed, there is still a need to provide a FRPT assembly that includes a fire-resistance rating of at least 2 hours and includes a structure for mounting a plurality of low voltage devices and a plurality of electrical outlets.

BRIEF SUMMARY OF THE INVENTION

A fire-rated poke-thru (FRPT) device for routing power and low voltage through an opening in a concrete floor assembly. The FRPT includes a support plate including an opening configured for mounting of a quad receptacle and cutouts for attachment of a plurality of low voltage keystones. The quad receptacle includes a central body with four corners. The support plate is configured for mounting of a low voltage keystone at each of the corners of the quad receptacle. A section of electrical metal tubing extends from the support plate. The FRPT includes a top flange, a sliding plate, a bottom seal off, and one or more intumescent discs. The FRPT may be inserted within the opening in the concrete floor and secured thereto. If exposed to the heat from a fire, the intumescent discs will expand around the FRPT and prevent spreading of the fire through the floor opening.

Further elements of the invention can be understood with reference to the following detailed description along with reference to the drawings.

BRIEF DESCRIPTION OF THE SEVERAL VIEWS OF THE DRAWING(S)

Reference is made herein to the accompanying drawings, which are not necessarily drawn to scale, and wherein:

FIG. 1 is a side elevation view of a first embodiment of a poke-thru device according to the invention.

FIG. 2 is a sectional view of the poke-thru device taken along line 2-2 of FIG. 1.

FIG. 3 is a top plan view of the poke-thru device of FIG. 1.

DETAILED DESCRIPTION OF THE INVENTION

Figure 6:
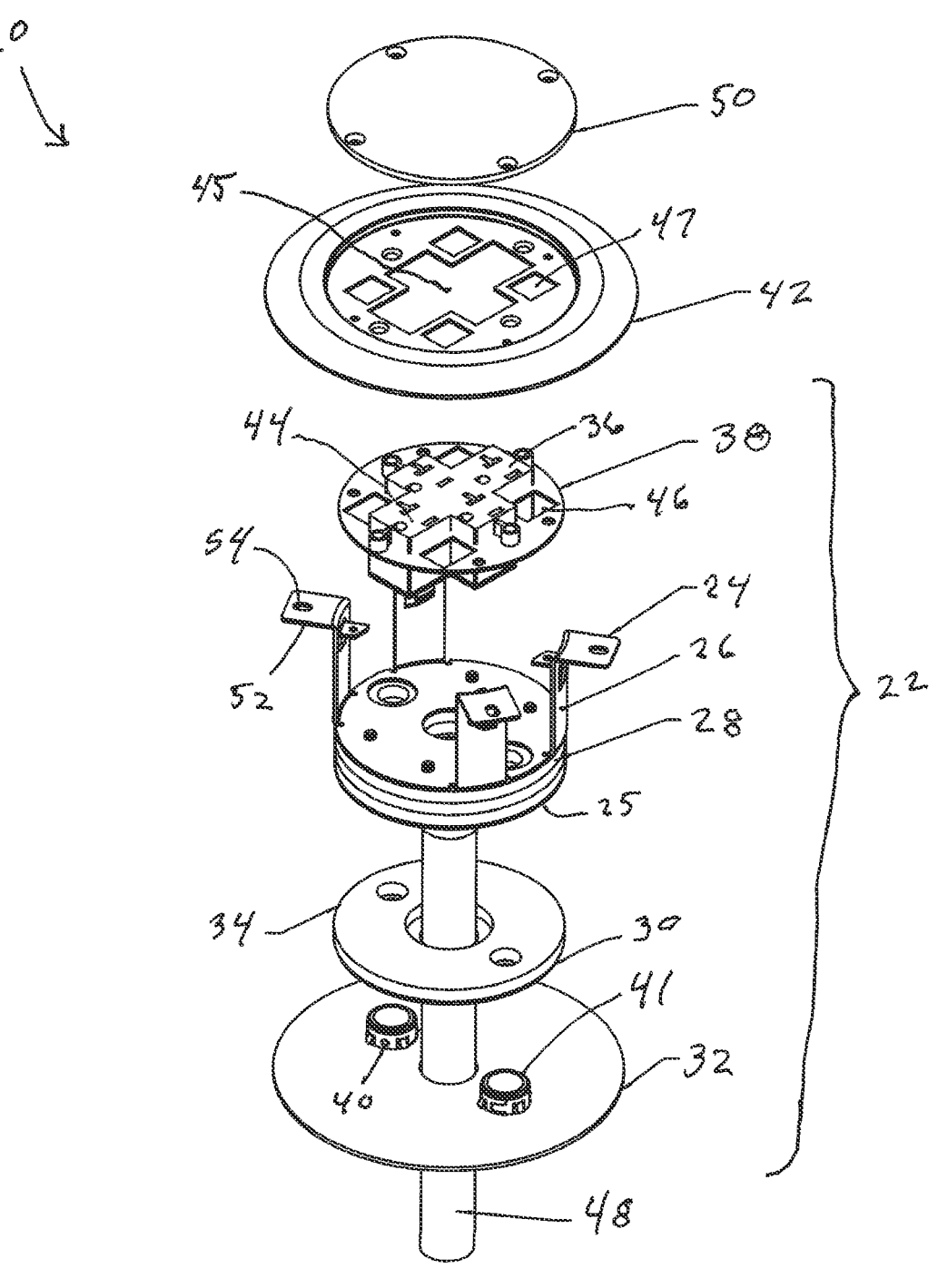
FIG. 6 is an exploded perspective view of the poke-thru device.

With reference to FIG. 6, a FRPT assembly 20 according to the invention includes a lower assembly 22 including a standoff 24. The standoff 24 includes a support plate 25, one or more standoff legs 26, and one or more intumescent discs 28. The FRPT assembly 20 further includes a sliding intermediate plate 30 and a bottom seal-off plate 32. The sliding intermediate plate 30 includes one or more intumescent discs 34. A quad receptacle 36 may be mounted to an integral plate 38 which in turn is mounted to the support plate 25.

The bottom seal-off plate 32 may include one or more apertures 40 therein for accommodating one or more electrical fittings 41 therein for securing one or more EMT raceways (not shown) for powering the quad receptacle 36. The FRPT assembly 20 further includes a floor flange 42 which includes one or more cutouts 47 for accessing the integral plate 38. The integral plate 38 will accommodate one or more outlet receptacles 44 and one or more keystone low voltage (LV) mounting areas 46 for mounting of keystones (not shown) for mounting low voltage devices such as audio/video (A/V) services or communications services. The floor flange includes an opening 45 for accommodating the quad receptacle 36 and cutouts 47 for accessing any LV devices mounted in the integral plate 38.

A section of electrical metal tubing 48 (EMT) extends through the bottom seal-off plate 32 and the sliding intermediate plate 30. The integral plate 38 is recessed from the floor flange 42 and a blank cover 50 may be secured to the integral plate 38 when the outlet receptacles 44 are not being used. The standoff legs 26 include feet 52 with apertures 54 therein to facilitate securing of the lower assembly 22 to a concrete floor.

With reference to FIGS. 1 and 2, the FRPT assembly 20 includes an EMT set-screw fitting 56 for securing the EMT 48 to the lower assembly 22, a collar 58 on the sliding intermediate plate 30 and one or more screws 60 for securing the sliding intermediate plate to the EMT 48. Another collar 62 is integral with the bottom seal-off plate 32 with one or more screws 64 for securing the bottom seal-off plate to the EMT 48.

Referring to FIG. 3, the quad receptacle 36 preferably includes four outlet receptacles 44 and four keystone low voltage mounting areas 46 for mounting of keystones.

Figures 4, 5:
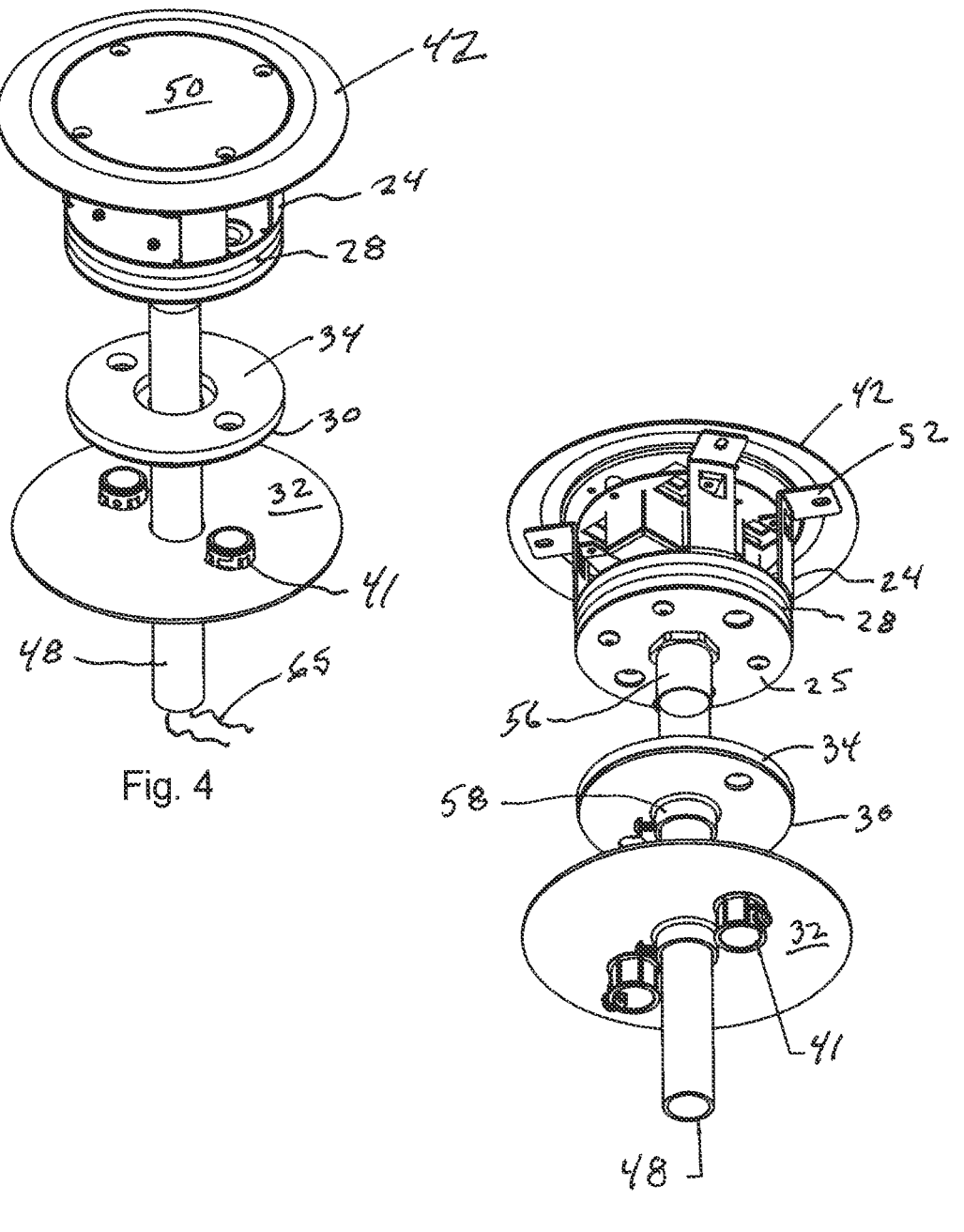
FIG. 4 is a top isometric view of the poke-thru device with a blank cover installed.
FIG. 5 is a bottom isometric view of the poke-thru device.

Referring to FIG. 4, preferably the bottom seal-off plate 32 includes two electrical fittings 41 therein for securing two EMT raceways (not shown). Preferably one or more 110 v wires 65, most preferably long enough to extend from the quad receptacle 36 to the lower end of the EMT, extend from the outlet receptacles 44 through the EMT.

Figures 7, 8, 9:
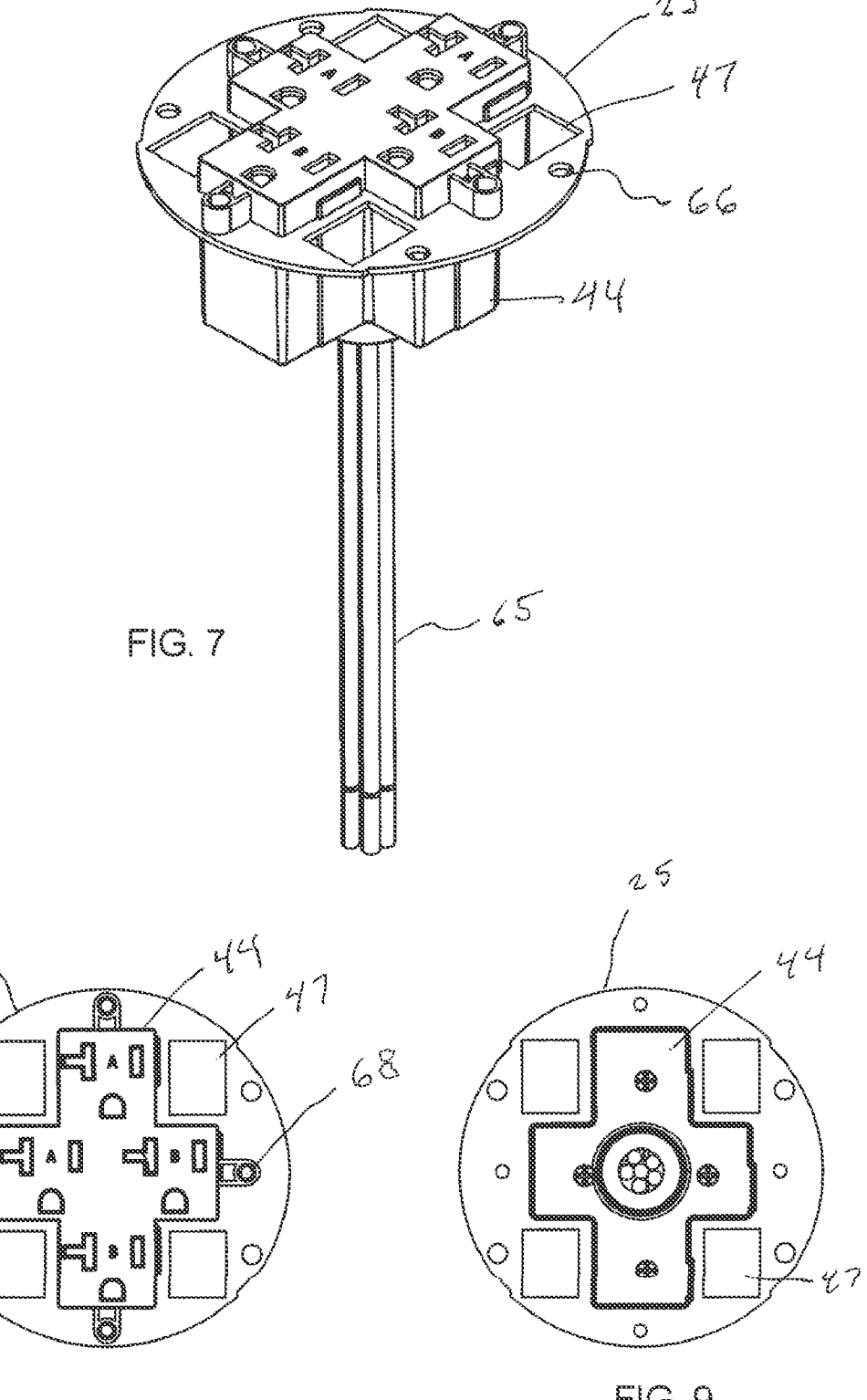
FIG. 7 is a top isometric view of a an assembly of the quad receptacle installed to the integral plate.
FIG. 8 is a top view of the integral plate with a quad receptacle installed thereto.
FIG. 9 is a bottom view of the integral plate with the installed quad receptacle.

With reference to FIGS. 7-9, the support plate 25 includes one or more apertures 66 for insertion of screws for mounting the quad receptacle 36 to the standoff 24 (see FIG. 1).

There are also one or more tapped holes 68 in the support plate 25 for attachment of the steel floor flange 42 (see FIG. 1).

Figure 10:
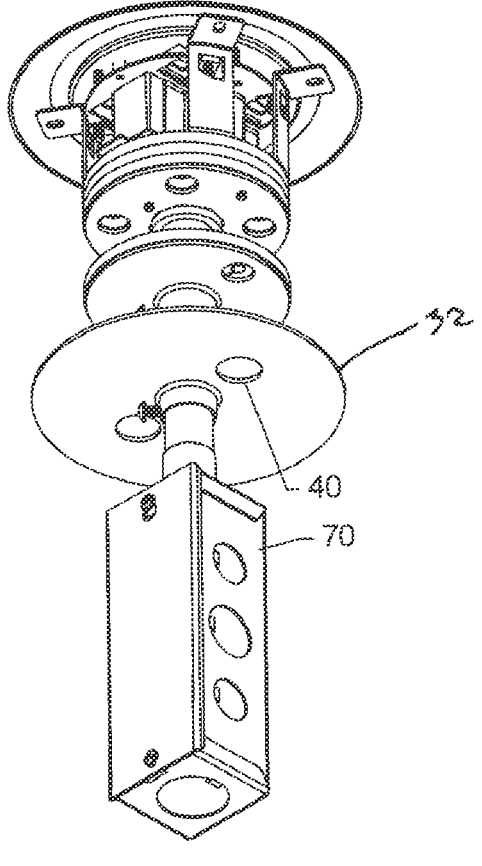
FIG. 10 is a perspective view of a second embodiment of the poke-thru device including an attached electrical junction box.
Figure 11:
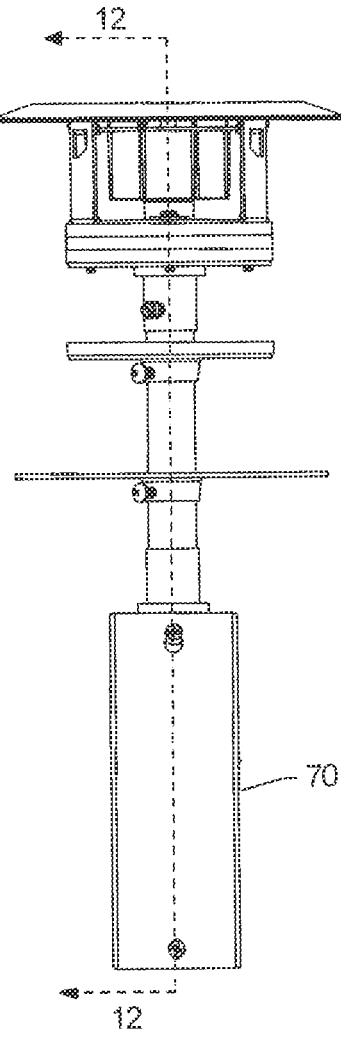
FIG. 11 is an elevation view of the second embodiment of the poke-thru device.

Referring to FIGS. 10 and 11, the bottom seal-off plate 32 may include one or more apertures 40 for attaching EMT raceways (not shown) for low voltage cables if desired. An electrical box 70 permits raceway attachment thereto.

Figure 12:
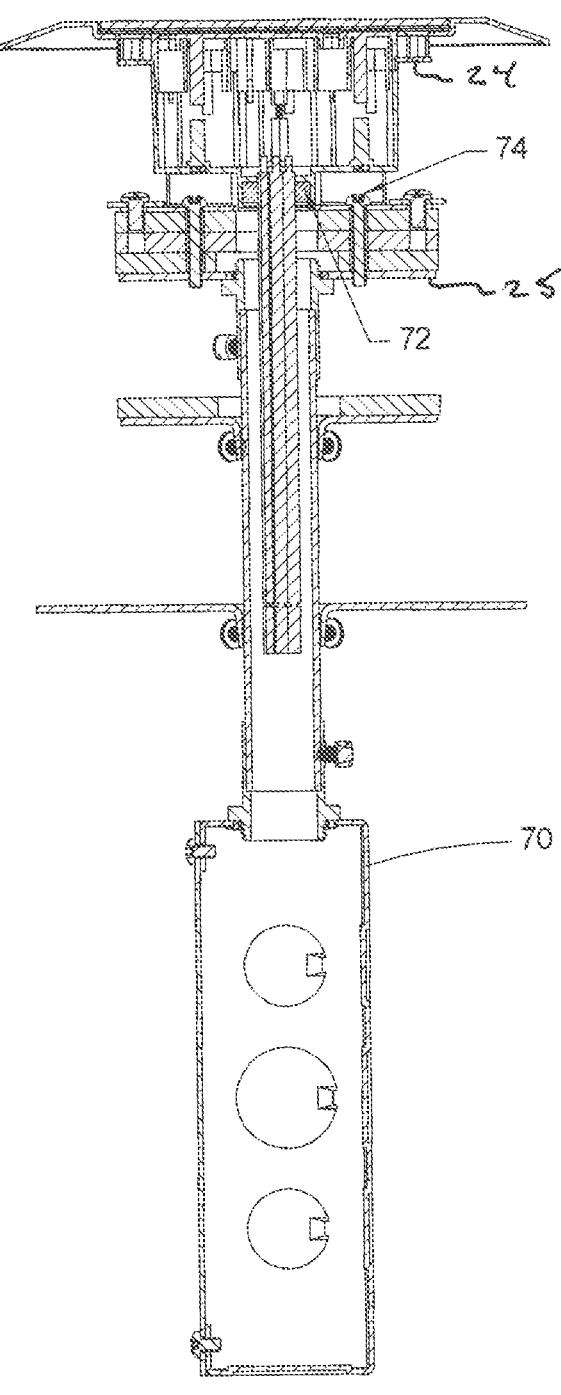
FIG. 12 is a sectional view of the poke-thru device taken along line 12-12 of FIG. 11.

Referring to FIG. 12, an intumescent split ring 72 may be inserted around the 110 volt wires and within the EMT to provide a seal at that portion of the FRPT. Screws 74 secure the standoff 24 to the support plate 25.

Referring to FIG. 6, operation of the FRPT assembly 20 includes the steps of:

a. Drilling a hole in a concrete floor;

b. Fitting the lower assembly 22 including the standoff legs 26, the EMT 48, and the sliding intermediate plate 30 into the hole;

c. Anchoring the lower assembly 22 to the concrete with screws through the legs 26 of the standoff 24;

d. Sliding the intermediate plate 30 with intumescent disc 34 up against the support plate 25 of the standoff assembly 22 and securing it to the EMT with the set screw;

e. Sliding the bottom seal-off plate 32 up against the intermediate plate 30 and securing it to the EMT 48 with the set screw;

f. Pulling low voltage (LV) wiring if needed;

g. Making wiring connections to the quad receptacle 36 and to any installed low voltage devices;

h. Securing the quad receptacle 36 with integral plate 38 to the lower assembly 22;

i. Securing the floor flange 42 to the lower assembly 22; and j. Securing the blank cover 50 if needed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A fire-rated poke-through (FRPT) comprising:
a support plate;

a standoff;
one or more intumescent discs on said support plate;
an electrical metal tubing (EMT) set-screw fitting extending from said support plate;
one or more intumescent discs on a sliding steel intermediate plate;
a first collar on said on said sliding intermediate plate;
a screw in said first collar;
a bottom sealoff plate;
a second collar on said bottom sealoff plate;
a screw in said second collar; and
one or more electrical fittings for EMT raceways on said bottom sealoff plate.

2. The FRPT of claim 1 wherein said standoff comprises:
one or more standoff legs;
a foot on each of said standoff legs; and
an aperture in each foot of said standoff legs.

3. The FRPT of claim 1 comprising:
a steel integral plate with an opening therein;
a quad outlet receptacle secured to said integral plate; and
said quad outlet receptacle having four outlets projecting through said opening in said integral plate.

4. The FRPT of claim 3 comprising:
a steel floor flange; and
an opening for said quad outlet receptacle in said floor flange.

5. The FRPT of claim 3 comprising:
a section of electrical metal tubing (EMT) secured to said support plate; and
wires within the EMT for powering said quad outlet receptacle.

6. The FRPT of claim 5 comprising an intumescent split ring inserted around the wires and within the EMT.

7. The FRPT of claim 4 comprising one or more cutouts in said floor flange for accessing the support plate.

8. The FRPT of claim 3 comprising said integral plate including one or more keystone low voltage (LV) mounting areas for mounting low voltage devices.

9. The FRPT of claim 3 comprising a blank cover secured to said integral plate when said quad outlet receptacle is not being used.

10. The FRPT of claim 7 wherein said support plate comprises:
one or more apertures for insertion of screws for mounting the quad outlet receptacle to the standoff; and
one or more tapped holes for attachment of the steel floor flange.

* * * * *